US012669712B2

(12) United States Patent
Roimi et al.

(10) Patent No.: US 12,669,712 B2
(45) Date of Patent: *Jun. 30, 2026

(54) HEAD WEARABLE DISPLAY RELIABILITY VERIFICATION

(71) Applicant: Elbit Systems Ltd., Haifa (IL)

(72) Inventors: Yaniv Roimi, Haifa (IL); Ben-Yishai Rani, Haifa (IL); Adi Charny, Haifa (IL)

(73) Assignee: Elbit Systems Ltd., Haifa (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/944,786

(22) Filed: Nov. 12, 2024

(65) Prior Publication Data

US 2025/0067987 A1 Feb. 27, 2025

Related U.S. Application Data

(63) Continuation of application No. 16/095,380, filed as application No. PCT/IL2017/050464 on Apr. 20, 2017, now Pat. No. 12,140,758.

(30) Foreign Application Priority Data

Apr. 21, 2016 (IL) .......................................... 245334

(51) Int. Cl.
*G02B 27/01* (2006.01)
*G02B 27/00* (2006.01)
(Continued)

(52) U.S. Cl.
CPC ..... *G02B 27/0172* (2013.01); *G02B 27/0093* (2013.01); *G02B 27/017* (2013.01);
(Continued)

(58) Field of Classification Search
CPC ... G06F 3/012; G02B 27/017; G02B 27/0093; G02B 27/0172; G02B 2027/0187;
(Continued)

(56) References Cited

U.S. PATENT DOCUMENTS 5,933,125 A 8/1999 Fernie et al.
7,046,215 B1 5/2006 Bartlett
(Continued)

FOREIGN PATENT DOCUMENTS

EP 2341386 7/2011

OTHER PUBLICATIONS

Fernando Caballero et al., "A Robust Head Tracking System Based on Monocular Vision and Planar Templates", Sensors, vol. 9, No. 11, Nov. 11, 2009, pp. 8924-8943.
(Continued)

*Primary Examiner* — Nitin Patel
(74) *Attorney, Agent, or Firm* — PEARL COHEN ZEDEK LATZER BARATZ LLP

(57) ABSTRACT

Head wearable display (HWD) systems and methods of display reliability verification with respect to the HWD operated by a user are provided, which comprise tracking a position and orientation (P&O) of the HWD relative to hardware element(s) at known position(s), which are selected from a surroundings of the user and are visible to the user through the HWD, calculating position(s) of the hardware element(s) with respect to the HWD, and displaying, in the HWD and according to the calculated position(s), verification symbol(s) that correspond to the hardware element(s). Display reliability verification may be carried out automatically using a camera and an image processing module, optionally with an additional illuminator, which compares the element(s)'s captured locations with the element(s)'s expected location according to the tracking, and
(Continued)

indicates possible discrepancies. Discrepancy identification may be used to initiate a correction process or to indicate the presented symbology to be unreliable.

12 Claims, 8 Drawing Sheets

(51) Int. Cl.
  *G06F 3/01*        (2006.01)
  *G09G 3/00*        (2006.01)
(52) U.S. Cl.
  CPC ............. *G06F 3/012* (2013.01); *G09G 3/006* (2013.01); *G02B 2027/0138* (2013.01); *G02B 2027/0181* (2013.01); *G02B 2027/0187* (2013.01); *G09G 2320/0693* (2013.01)
(58) Field of Classification Search
  CPC .... G02B 2027/0138; G02B 2027/0181; G09G 3/006; G09G 2320/0693
  See application file for complete search history.

(56)                References Cited

U.S. PATENT DOCUMENTS

| | | | |
|---|---|---|---|
| 7,928,927 | B1 | 4/2011 | Krenz et al. |
| 10,360,877 | B2 * | 7/2019 | Osman ...................... G06F 3/16 |
| 10,895,949 | B2 * | 1/2021 | Shih ......................... G06F 3/011 |
| 11,067,814 | B2 * | 7/2021 | Ophir ................. G02B 27/0172 |
| 11,093,208 | B2 * | 8/2021 | Hudman ................. G06F 3/147 |
| 11,422,370 | B2 * | 8/2022 | Shahal ............... G02B 27/0172 |
| 11,561,392 | B2 * | 1/2023 | Grahsl ............... G02B 27/0101 |
| 2005/0215879 | A1 | 9/2005 | Chuanggui |
| 2006/0181483 | A1 | 8/2006 | Ari |
| 2008/0243142 | A1 | 10/2008 | Gildenberg |
| 2010/0001928 | A1 | 1/2010 | Nutaro |
| 2011/0183301 | A1 | 7/2011 | Turner |
| 2012/0293395 | A1 | 11/2012 | Williams et al. |
| 2014/0333665 | A1 | 11/2014 | Sylvan et al. |
| 2014/0375540 | A1 | 12/2014 | Ackerman et al. |
| 2015/0002375 | A1 | 1/2015 | Williams et al. |
| 2015/0250553 | A1 | 9/2015 | Jaramaz et al. |
| 2015/0331487 | A1 | 11/2015 | Roth et al. |

OTHER PUBLICATIONS

Gilson Stuart J. et al., "Spatial Calibration of an Optical See-Through Head-Mounted Display", Journal of Neuroscience Methods, vol. 173, No. 1, Aug. 15, 2008, pp. 140-146.

Kato H. et al., "Marker Tracking and HMD Calibration for a Video-Based Augmented Reality Conferencing System", Augmented Reality 1999. (IWAR '99). Proceedings. 2nd IEEE and ACM International Workshop on San Francisco, CA, USA Oct. 1999, Los Alamitos, CA, USA, IEEE Comput. Soc, US, Oct. 20, 1999, pp. 85-94.

Maeda M. et al., "Tracking of User Position and Orientation by Stereo Measurement of Infrared Markers and Orientation Sensing", Wearable Computers, 2004. ISWC 2004. Eighth International Symposium on Arlington, VA, USA Oct. 2004, Piscataway, NJ, USA, IEEE, Oct. 31, 2004, pp. 77-84.

Oishi T. et al., "Calibration Method of Visual Parameters for See-Through Head-Mounted Display", Multisensor Fusion and Integration for Intelligent Systems, IEEE International Conference on MFI '94. Las Vegas, NV, USA, Oct. 2-5, 1994, New York, NY, USA, IEEE, Oct. 2, 1994, pp. 447-454.

\* cited by examiner

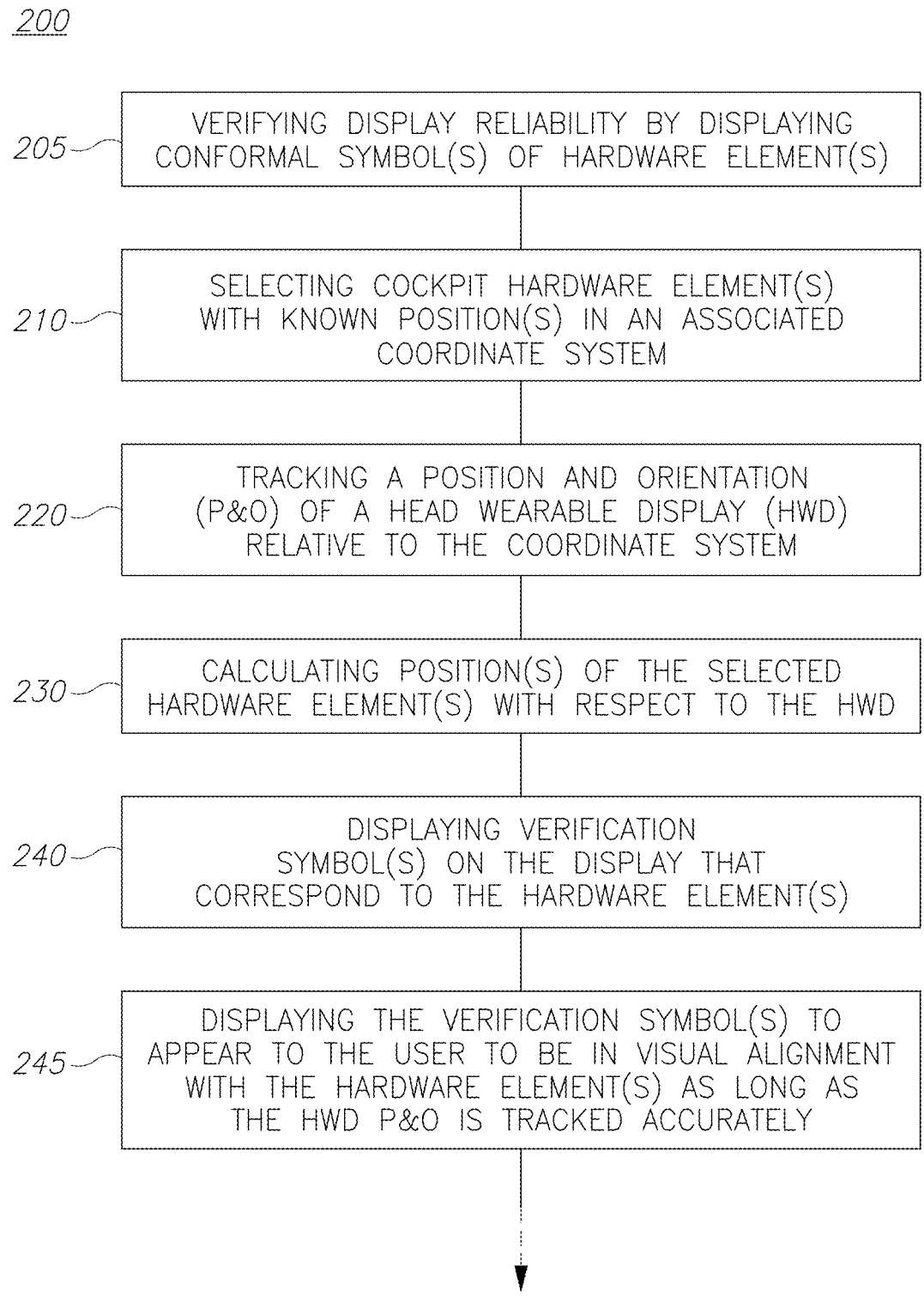

_200_

205 — VERIFYING DISPLAY RELIABILITY BY DISPLAYING CONFORMAL SYMBOL(S) OF HARDWARE ELEMENT(S)

210 — SELECTING COCKPIT HARDWARE ELEMENT(S) WITH KNOWN POSITION(S) IN AN ASSOCIATED COORDINATE SYSTEM

220 — TRACKING A POSITION AND ORIENTATION (P&O) OF A HEAD WEARABLE DISPLAY (HWD) RELATIVE TO THE COORDINATE SYSTEM

230 — CALCULATING POSITION(S) OF THE SELECTED HARDWARE ELEMENT(S) WITH RESPECT TO THE HWD

240 — DISPLAYING VERIFICATION SYMBOL(S) ON THE DISPLAY THAT CORRESPOND TO THE HARDWARE ELEMENT(S)

245 — DISPLAYING THE VERIFICATION SYMBOL(S) TO APPEAR TO THE USER TO BE IN VISUAL ALIGNMENT WITH THE HARDWARE ELEMENT(S) AS LONG AS THE HWD P&O IS TRACKED ACCURATELY

Figure 3

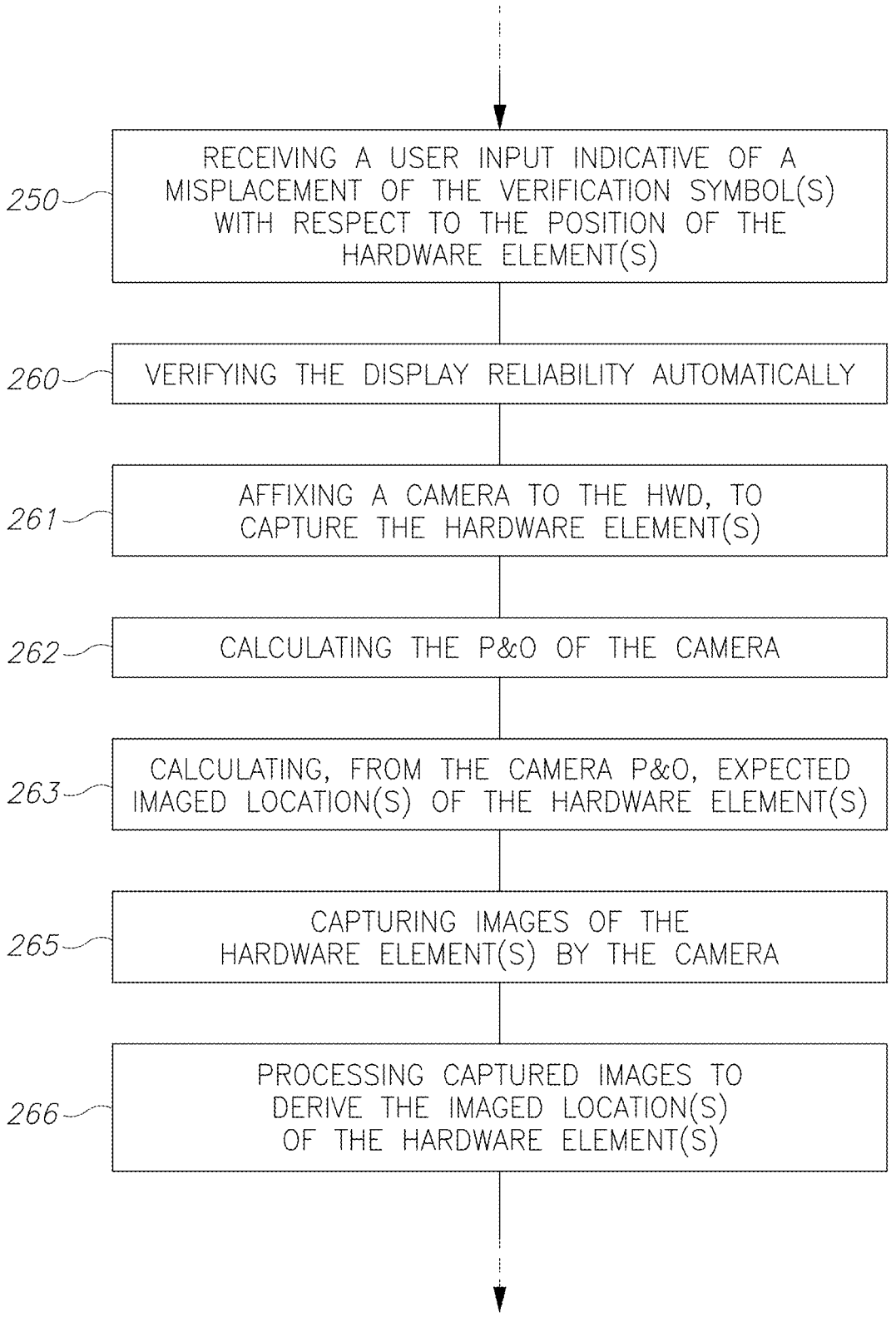
Figure 3 (cont. 1)

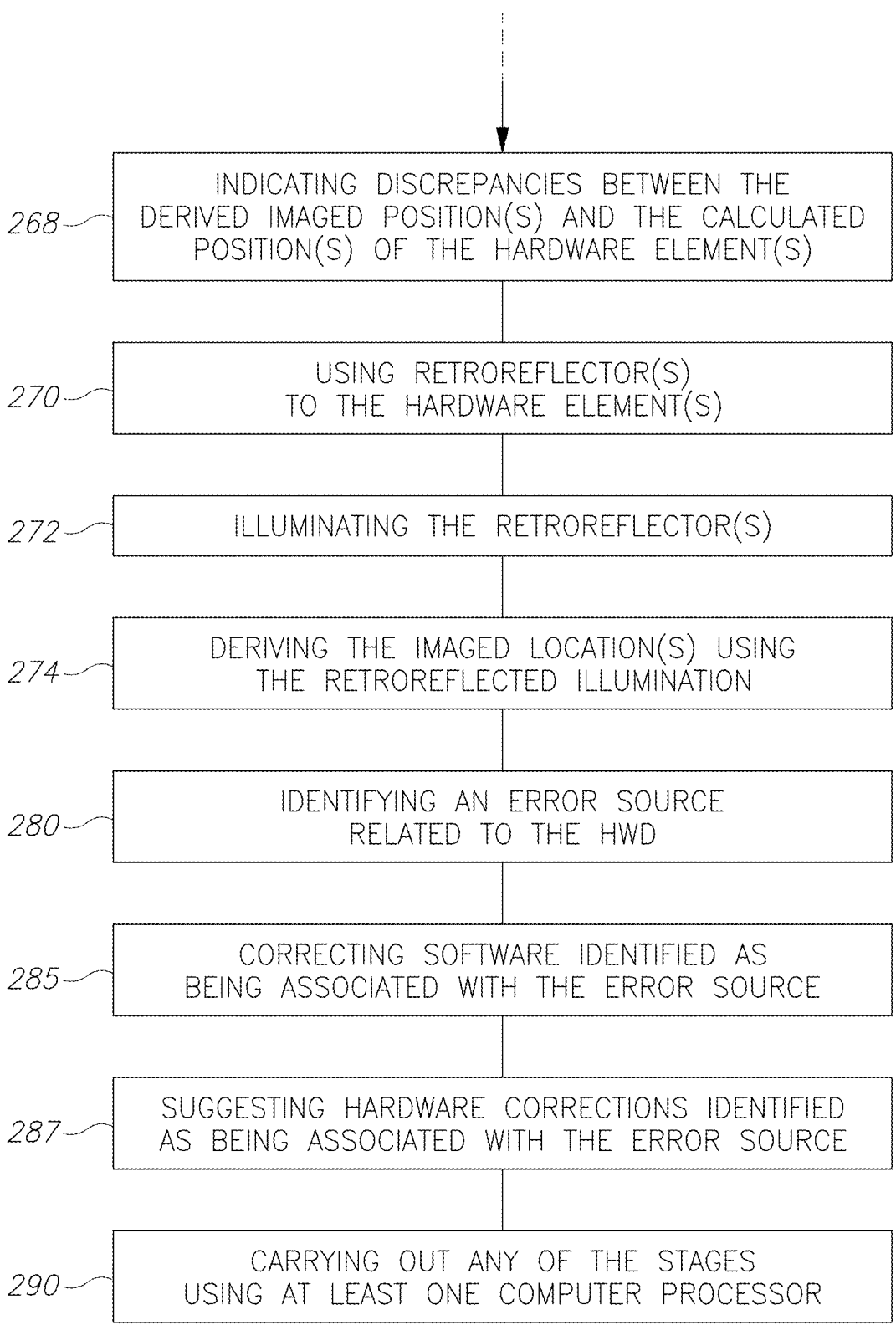
Figure 3 (cont. 2)

HEAD WEARABLE DISPLAY RELIABILITY VERIFICATION

CROSS REFERENCE TO RELATED APPLICATION

This application is a Continuation application of U.S. patent application Ser. No. 16/095,380 filed on Oct. 22, 2018 which is a National Phase Application of PCT International Application No. PCT/IL2017/050464, filed on Apr. 20, 2017, which claims the priority of Israeli Patent Application No. 245334, filed Apr. 21, 2016, all of which are hereby incorporated by reference in their entirety.

BACKGROUND OF THE INVENTION

1. Technical Field

The present invention relates to the field of head wearable displays, and more particularly, to the verification of real-world conformity and reliability of head wearable displays.

2. Discussion of Related Art

Head wearable displays are used in various circumstances to provide symbology that enhances the information content of viewed scenes. In particular, pilot head wearable displays provide crucial flight information which is presented conformally to the viewed scene and to objects in the scene.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a method of reliability verification of a head wearable display (HWD) operated by a user, the method comprising: tracking a position and orientation (P&O) of the HWD relative to at least one hardware element at known position(s), which is selected from a surroundings of the user and is visible to the user through the HWD, calculating at least one position of the at least one selected hardware element with respect to the HWD, and displaying, in the HWD and according to the at least one calculated position, at least one verification symbol that corresponds to the at least one hardware element, wherein a misalignment of the at least one verification symbol with respect to the corresponding at least one hardware element is used to indicate unreliability of the HWD.

One aspect of the present invention provides a method of automatic reliability verification of a head wearable display (HWD) operated by a user, the method comprising: tracking a position and orientation (P&O) of the HWD and of a camera affixed thereto, relative to at least one hardware element at known position(s), which is selected from a surroundings of the user and is visible to the user through the HWD, capturing images of the at least one hardware element by the camera, calculating at least one position of the at least one hardware element with respect to the tracked P&O of the HWD and of the camera, and calculating therefrom at least one expected imaged location of the at least one hardware element, processing the captured images to derive respective at least one imaged location of the at least one hardware element, and indicating a discrepancy between the at least one derived imaged location and the at least one expected imaged location, wherein at least one of the tracking, the calculating, the processing and the indicating is carried out by at least one computer processor.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIG. 3 is a high level flowchart illustrating a method of display reliability verification with respect to a head wearable display, according to some embodiments of the invention.

DETAILED DESCRIPTION OF THE INVENTION

Figure 1A:
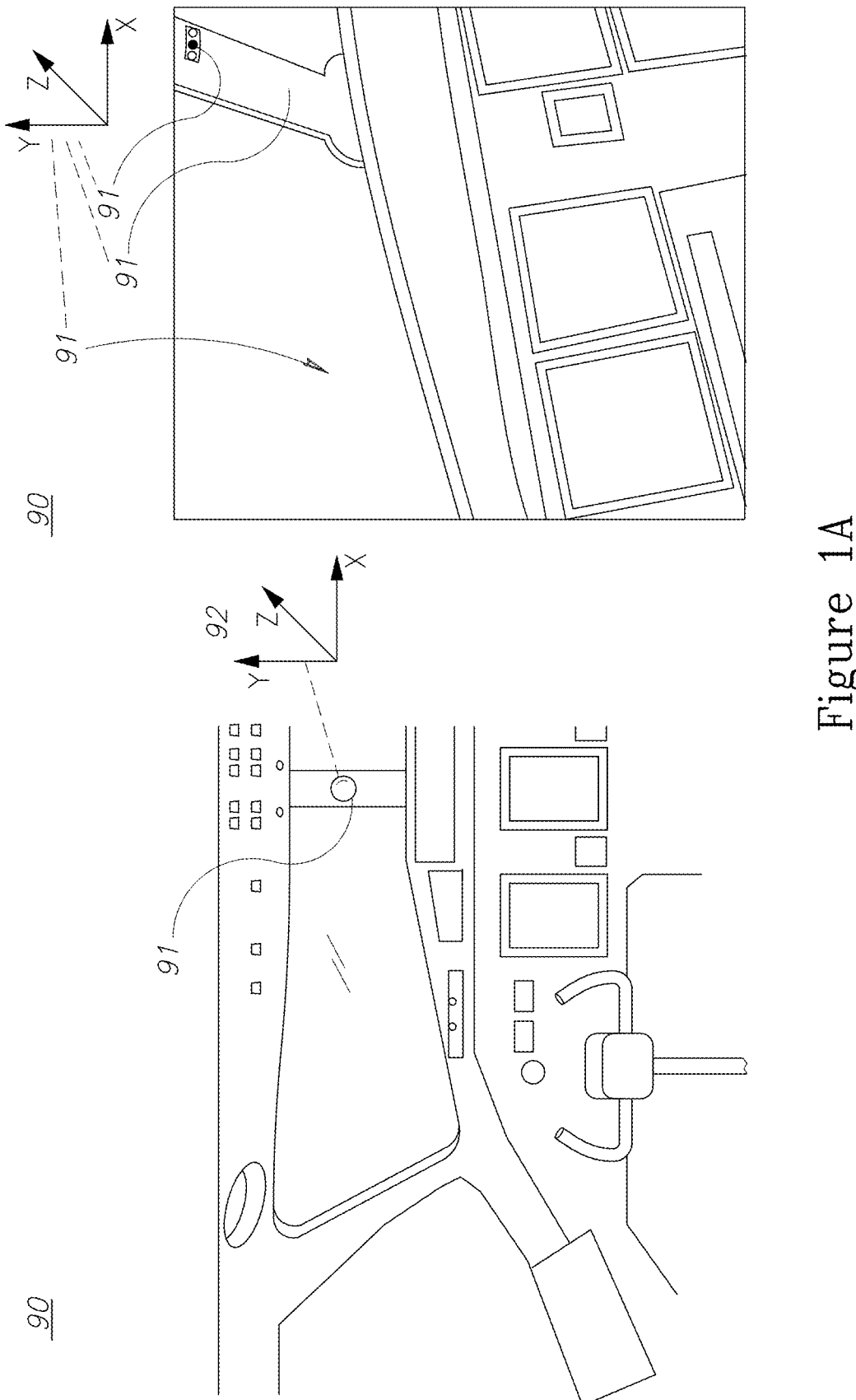
FIG. 1A presents high level schematic illustrations of a cockpit, according to the prior art.

Prior to the detailed description being set forth, it may be helpful to set forth definitions of certain terms that will be used hereinafter.

The term "hardware element" as used in this application refers to any element that has a known position (possibly fixed elements) in surroundings of a user such as an aircraft cockpit or any other surrounding in which the user operated the HWD. Hardware elements, as used herein, must be visible to the user during the operation of the HWD, e.g., visible to a pilot during flight. The term "hardware element" as used in this application may also refer to geometric elements which relate to fixed elements in the surroundings, such as the geometric shapes of hardware elements in the surroundings, e.g., a shape of a display or a window.

The term "coordinate system" as used in this application refers to a frame of reference which may be associated and fixed with respect to the hardware element or any other frame of reference.

The term "head wearable display system" as used in this application refers to an operative combination of a head wearable display (HWD) and associated tracker unit(s) and computer processor(s) that provide a conformal symbology display on the HWD. The term "tracker" as used in this application refers to one or more units that measure a position and orientation (P&O) of objects such as the HWD and associated elements in the coordinate system of the cockpit or the aircraft. The term "user" as used in this application refers to any person operating the HWD. While examples are given of pilots operating the HWD in a cockpit, user may be any operators of any vehicle or system, as well as persons using the HWD irrespective of any platform.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phrascology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units may be at least partially implemented by a computer processor.

Displaying conformal symbology over a head wearable display (HWD such as HMD—head mounted display, NTE—near to cyc, etc.) involves a HWD tracking system which calculates the HWD orientation and enables presenting the symbology over the HWD in a conformal manner with respect to the real world. The conformity of the symbology to the real world may be critical, with lack of conformity rendering the HWD unreliable. For example, in civil aviation, displaying a non-conformal Flight Path Symbol (FPV) over a head up display may result, in certain phases of flight, in a catastrophic event. Other examples include symbology of a horizon line, of landing place parameters or of other aircrafts—which must represent correctly the respective real world items in order for the symbology and HWD to be reliable. In the following it is suggested to use a special symbol—'sanity symbol'—to ensure that the HWD tracking system is functioning correctly and its output does not lead to non-conformal and unreliable symbology. Manual verification that the location of the symbol over a pre-defined fixed target is correct provides a verification of the correctness of the HWD tracking system. The 'sanity symbol' may be utilized to detect other failure conditions that may lead to a misleading, non-conformal symbology, such as optics/visor movements and display/image shift.

The 'sanity symbol' is a conformal symbol over a fixed target. The fixed target is chosen such that it doesn't change its location relative to the aircraft. The 'sanity symbol' is drawn on the HWD in a position that corresponds, conformally, with the fixed target (when the pilot looks at the fixed target, the symbol is visually aligned with the fixed target).

Head wearable displays (HWDs) and methods of display reliability verification with respect to the HWD are provided, which comprise selecting hardware element(s) (e.g., cockpit hardware elements or aircraft parts outside the cockpit, which are visible to the pilot during the flight, such as the aircraft's nose) with known position(s) in a coordinate system that is fixed relative to the aircraft, tracking a position and orientation (P&O) of the HWD in the coordinate system, calculating a position of the selected hardware element(s) with respect to HWD, and displaying verification symbol(s) in the HWD that correspond to the hardware element(s), such that as long as the HWD P&O is accurately tracked, the verification symbol(s) appear to the pilot to be in visual alignment with the corresponding selected hardware element(s). Identification, by the pilot, of deviating verification symbols, may be used to initiate a correction process or merely to indicate that the presented symbology should not be relied upon when considering future actions. Display reliability verification may be carried out automatically using a camera and image processing, optionally with an additional illuminator, to derive the element(s)'s position independently of the HWD and indicate possible discrepancies.

FIG. 1A presents high level schematic illustrations of a cockpit 90, according to the prior art. Cockpit 90 has various static hardware elements 91 and provides a cockpit spatial reference frame with a coordinate system 92 that is fixed relative to the aircraft. Hardware elements 91 which are fixed in the aircraft and visible to the pilot during flight are also shown schematically.

Figure 1B:
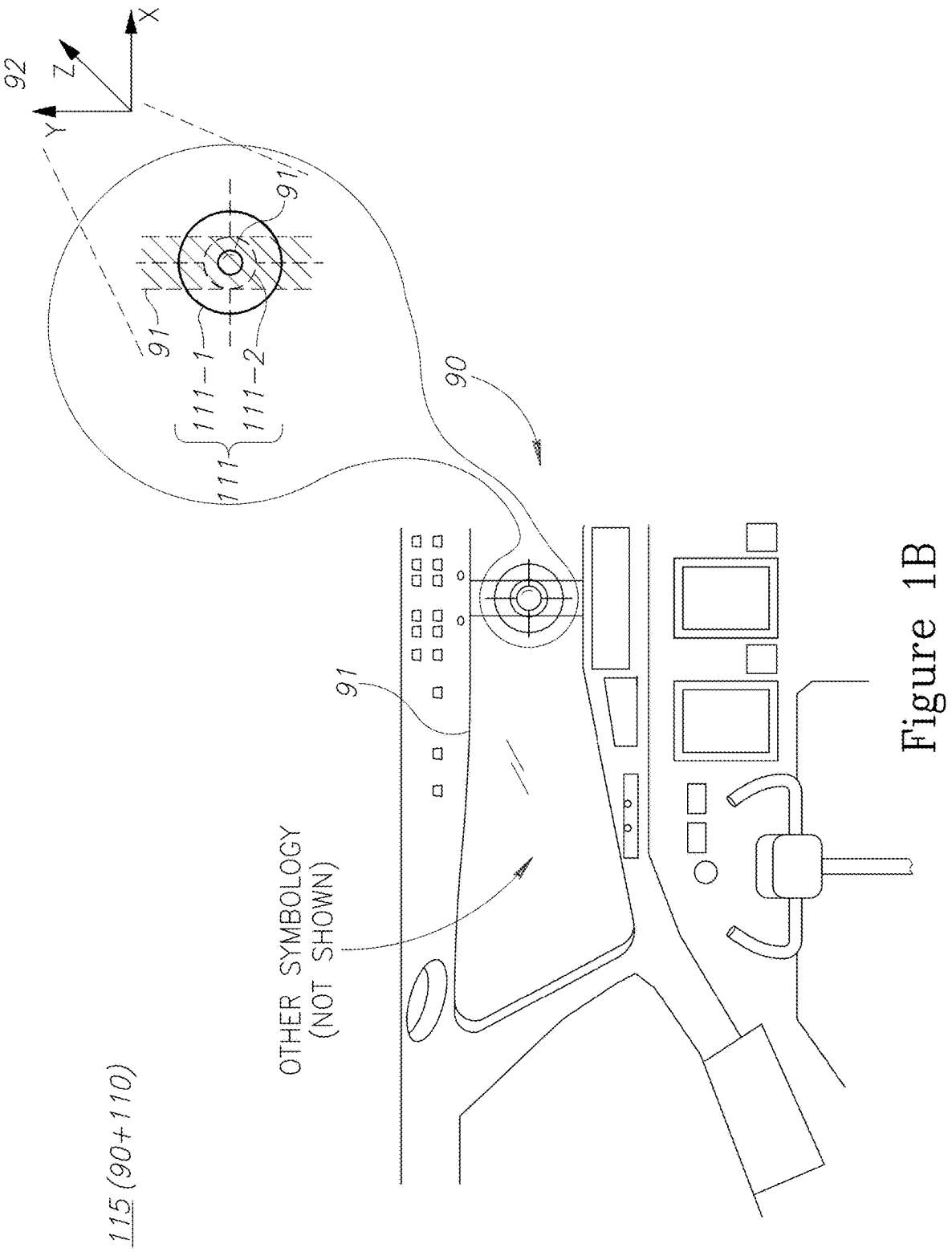
FIG. 1B is a high level schematic illustration of a cockpit as seen through the HWD, with a verification symbol displayed conformally to a hardware element, according to some embodiments of the invention.
Figure 2A:
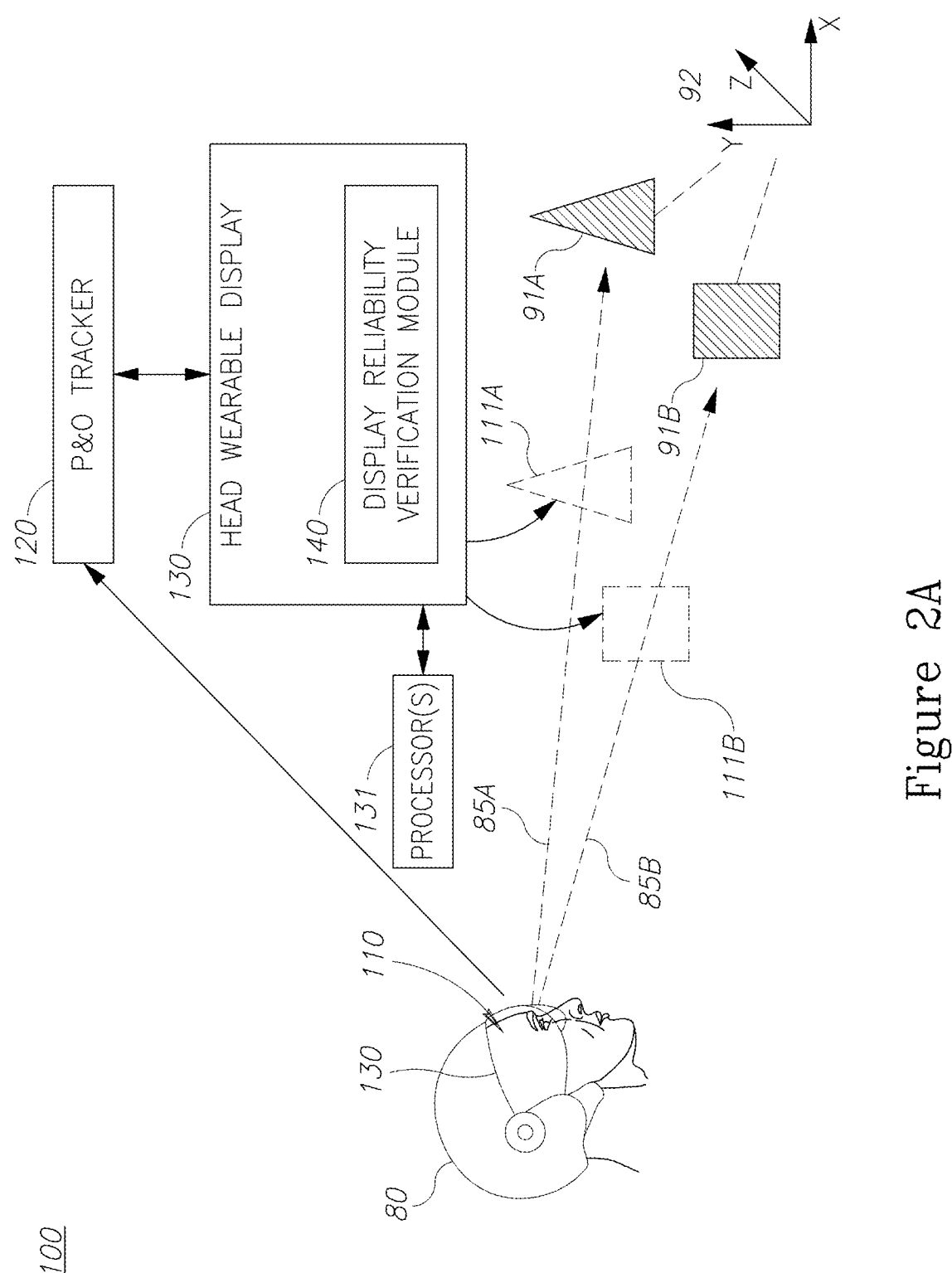
FIGS. 2A and 2B are high level schematic illustrations of HWDs of a pilot in the cockpit, according to some embodiments of the invention.
Figure 2B:
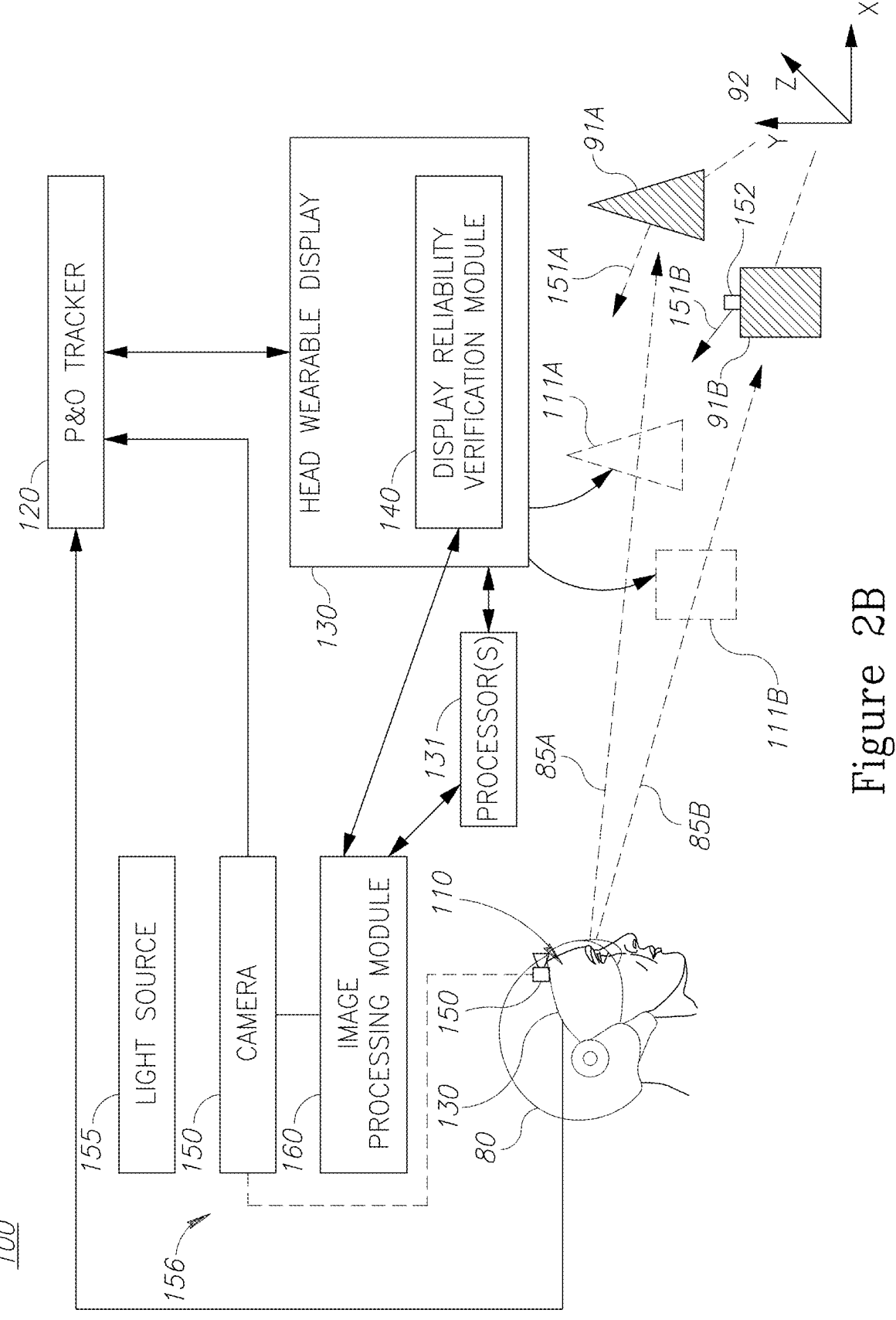

FIG. 1B is a high level schematic illustration of a cockpit as seen through the HWD, with a verification symbol 111 displayed conformally to a hardware element 91, according to some embodiments of the invention. Hardware element 91 may be a beam between cockpit windows, a ball element on the beam, or any other element in the cockpit, or any element that is fixed in an aircraft, which is visible to the pilot during flight (see e.g., FIG. 1A). Hardware element 91 may comprise multiple elements 91, associated with coordinate system 92, being a frame of reference which is associated and fixed with respect to hardware element 91. FIG. 1B schematically illustrates view 115 of cockpit 90 with overlaid HWD symbology 110, from which, for simplicity, only verification symbol 111 is shown (HWD 130 itself is shown in FIGS. 2A and 2B). Hardware element 91 may be selected to be a well observed and identified point in the cockpit or on visible aircraft parts, e.g., a distinguishable point or an element between the front windows.

When the pilot looks toward the hardware element (as a fixed target), verification ("sanity") symbol 111 is displayed overlaid on the fixed target (hardware element 91) and/or the fixed target (hardware element 91) is located inside a perimeter of verification ("sanity") symbol 111. If the fixed target is not inside the perimeter of the sanity symbol, the symbology may be non-conformal and should not be relied upon. The pilot may responsively ignore the symbology, switch off the display and/or initiate a correction process.

It is noted that hardware element(s) 91 may comprise geometric elements which relate to fixed elements in the surroundings, such as the geometric shapes or contours of hardware elements in the surroundings, e.g., a shape of a display or a window, as indicated e.g., in FIG. 1B or of visible features outside the windows, such protrusions from the aircraft nose. Selected hardware element(s) 91 are visible to a user operating the HWD during operation.

Moreover, verification symbol(s) 111 may comprise graphical elements that indicate different levels of tolerance, or thresholds, to the degree of overlap of verification symbol (s) 111 and hardware element(s) 91. For example, as illustrated in FIG. 1B, verification symbol(s) 111 may comprise an inner circle 111-2 indicating close tolerance (high threshold) and an outer circle 111-1 indicating relaxed tolerance (low threshold) to the degree of required conformity.

Figures 1C, 1D:
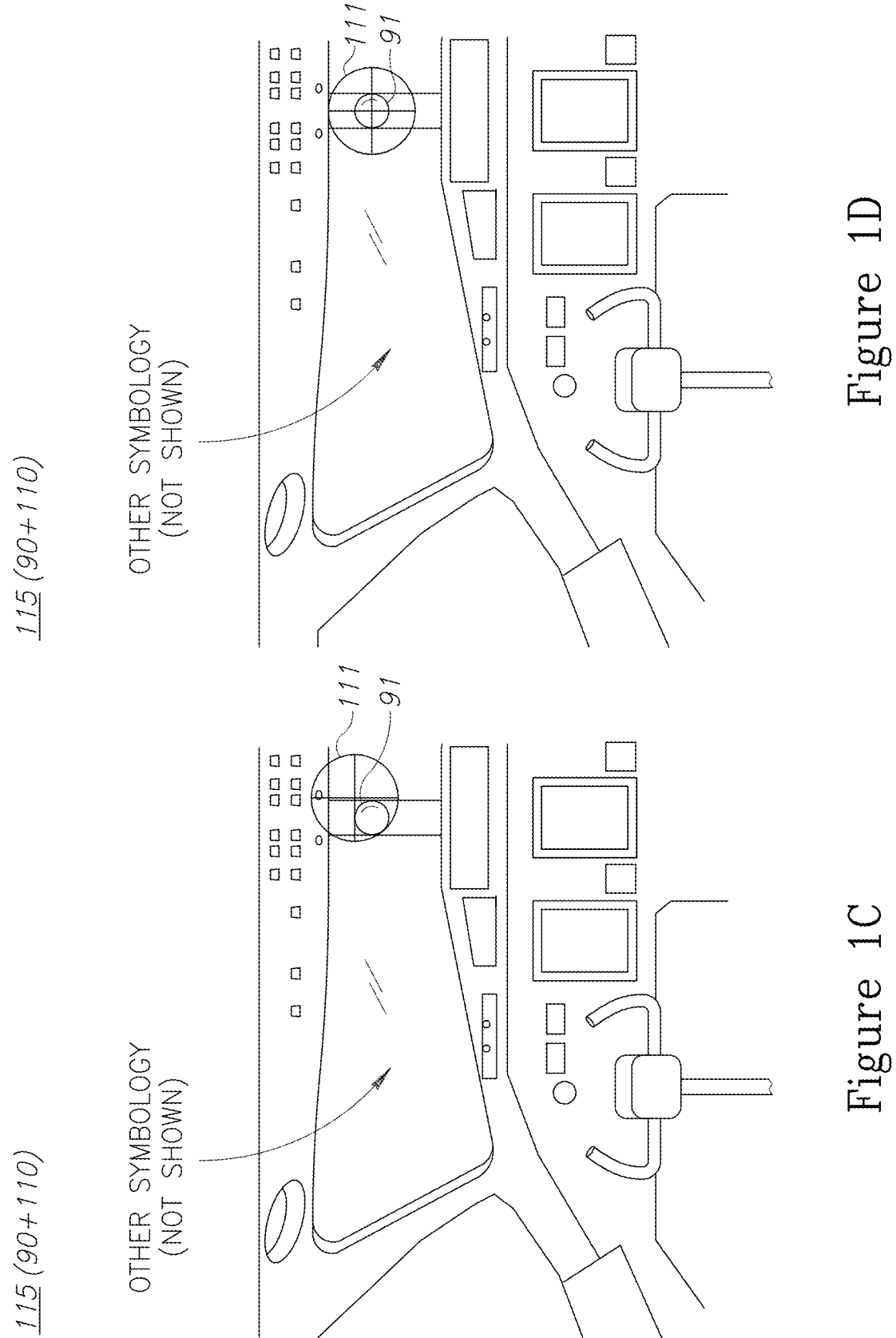
FIGS. 1C and 1D schematically illustrate wrong and correct positioning, respectively, of the verification symbol with respect to the hardware element, according to some embodiments of the invention.

FIGS. 1C and 1D schematically illustrate wrong and correct positioning, respectively, of verification symbol 111 with respect to hardware element 91, according to some embodiments of the invention. In FIG. 1C, verification symbol 111 is positioned off-center with respect to hardware element 91 and indicates thereby that symbology 110 provided by HWD 130 is wrong. In FIG. 1D, verification symbol 111 is centered with respect to hardware element 91 and indicates thereby that symbology 110 provided by HWD 130 is correct.

FIGS. 2A and 2B are high level schematic illustrations of a HWD system 100 used by a pilot 80, according to some embodiments of the invention. HWD system 100 comprises a HWD 130 and one or more position and orientation (P&O) tracker 120 configured to track the P&O of HWD 130 relative to coordinate system 92 that is fixed relative to the aircraft. It is noted that tracking the HWD may be carried out in any coordinate system. P&O tracker 120 may comprise a tracker element fixed to the cockpit, a tracker element fixed to HWD 130 and a tracker processor configured to provide the tracking data. Any of these elements is considered part of HWD system 100 and/or HWD 130. HWD system 100 is further configured to calculate the position of selected at least one hardware element 91 with respect to HWD 130 (e.g., by processor 131). HWD system 100 and/or HWD 130 further comprises a display reliability verification module 140 configured to display, as an addition to symbology 110 displayed on HWD 130, at least one verification symbol 111 that corresponds to selected at least one hardware element 91. Verification symbol(s) 111 are presented at locations that allow immediate identification of deviations thereof from the positions of corresponding hardware element(s) 91 so that as long as the HWD P&O is accurately tracked, verification symbol(s) 111 appear to the pilot to be in visual alignment with corresponding hardware element(s) 91. A misalignment of verification symbol(s) 111 with respect to the corresponding hardware element(s) 91 may be used to indicate unreliability of HWD 130. It is noted that the misalignment is with respect to the expected position of symbol 111 and the position of corresponding elements 91, and is referred to herein also by the term misplacement. Similar configurations may be applied to any HWD system 100, with HWD 130 operated by any user, with respect to any type of user surroundings.

FIG. 2A shows schematically two hardware elements 91A, 91B with associated verification symbols 111A, 111B, respectively, displayed along the lines of sight (LOS's) 85A, 85B of pilot 80 to elements 91A, 91B, respectively, as calculated from the HWD P&O and the positions of the hardware elements. It is noted that while regular symbology of head wearable displays usually requires only pilot head orientation information as the targets are considered to be at optical infinity, verification symbols 111 relate to physical elements at optical proximity to the head wearable display and hence the presentation thereof requires relating to the HWD position as well as to the HWD orientation. HWD 130 may be at least partially associated with a computer processor 131 and/or computer processor 131 may be part of HWD 130. Computer processor 131 may carry out at least some of the functionality of HWD 130 such as managing the display of verification symbol(s) 111, tracking the P&O of the pilot HWD and interfacing with pilot 80. HWD system 100 may comprise any number of processors 131, which may be dedicated to different tasks such as tracking the HWD, providing the symbology, providing the verification symbol (s) etc.

FIG. 2B schematically illustrates an additional camera 150 associated with or affixed to HWD 130 at a constant spatial relation (P&O relative to the HWD coordinate system). Camera 150 may be configured to continuously capture images 151 of hardware elements 91 in the cockpit and/or of visible aircraft parts. It is noted that aircraft parts outside the cockpit, such as hardware elements on the aircraft's nose which are visible from the pilot's position, may be used as hardware elements 91 in certain embodiments. Camera 150 is further associated with an image-processing module 160 that receives captured images 151 from camera 150 and is configured to identify hardware element(s) 91 in images 151 and compare the location of hardware element(s) 91 in captured images 151 to their expected locations, which are derived from the camera's known P&O relative to the HWD coordinate system, the calculated P&O of HWD 130 relative to coordinate system 92, and the known position of hardware element(s) 91 in coordinate system 92.

Head wearable display 130 may be further configured to receive user input concerning a misalignment of verification symbol(s) 111 with respect to the position(s) of hardware element(s) 91 and to identify an error source related to the misalignment. Head wearable display 130 may be further configured to correct software identified as being associated with the error source and/or suggest hardware corrections identified as being associated with the error source. For instance, when tracker 120 is an optical tracker, if the user indicates a misalignment, HWD 130 may be configured to suggest to the user (e.g., via a message on the display) to clean the lens of tracker unit 120 (the error source may be dirt on tracker unit 120, e.g. dust on the lens of a tracker camera may cause an erroneous P&O).

Certain embodiments comprise an automated HWD reliability verification kit 156 comprising one or more camera 150 affixed to HWD 130 and configured to capture at least one selected hardware element 91, and image processing module 160 configured to process images 151 of at least one hardware element 91 which is/are captured by camera 150 and to derive an imaged location of at least one hardware element 91. Image processing module 160 and/or HWD 130 may be further configured to indicate a discrepancy between the derived imaged location of hardware element(s) 91 and the expected imaged location thereof. Automated HWD reliability verification kit 156 may further comprise at least one retroreflector 152, associated with corresponding at least one hardware element 91 (91B in FIG. 2B), and an illuminator 155 associated with camera 150 and configured to illuminate at least one cockpit hardware element 91. Images 151 captured by camera 150 may comprise hardware element images 151A and/or illumination reflections 151B from retroreflector(s) 152, and image processing module 160 may be configured to derive the imaged location using retroreflected illumination 151B as well as hardware element images 151A. Discrepancies may be used to indicate non-conformity and unreliability of the HWD symbology 110 and/or an error source in HWD 130, and may be corrected by software or hardware.

FIG. 3 is a high level flowchart illustrating a method 200 of display reliability verification with respect to a head wearable display, according to some embodiments of the invention. The method stages may be carried out with respect to head wearable display 130 described above, which may optionally be configured to implement method 200. Method 200 may be at least partially implemented by at least one computer processor 131. Certain embodiments comprise computer program products comprising a computer readable storage medium having computer readable program embodied therewith and configured to carry out of the relevant stages of method 200.

Method 200 may comprise verifying display reliability by displaying conformal symbol(s) of cockpit element(s) (stage 205). At least one hardware element with known position(s) in an associated coordinate system (which is fixed relative to the aircraft) may be selected (stage 210) to be used as reference element(s). Selected hardware element(s) are visible to the user operating the HWD during operation. Method 200 may comprise tracking a position and orientation (P&O) of a HWD (stage 220) relative to the coordinate system, calculating position(s) of the selected hardware element(s) with respect to the HWD (stage 230) and displaying at least one verification symbol that corresponds to at least one hardware element in the HWD (stage 240). Method 200 may comprise displaying the verification symbol(s) to appear to the pilot to be in visual alignment with the hardware element(s) as long as the HWD P&O is tracked accurately (stage 245). A misplacement (or misalignment) of the at least one verification symbol with respect to the corresponding at least one hardware element may be used to indicate unreliability of the HWD. Method 200 may be applied to any HWD system 100, with HWD 130 operated by any user, with respect to any type of user surroundings.

Method 200 may further comprise receiving a user input indicative of a misplacement of the at least one verification symbol with respect to at least one position of the at least one hardware element (stage 250), and identifying an error source related to the misplacement (stage 280). Method 200 may further comprise correcting software identified as being associated with the error source (stage 285) and/or suggesting hardware corrections identified as being associated with the error source (stage 287).

Method 200 may further comprise verifying automatically the display reliability with respect to a pilot's HWD (stage 260) by affixing a camera to the HWD to capture the at least one selected hardware element (stages 220, 261), tracking the P&O of the HWD and of the camera affixed thereto, relative to the coordinate system (stage 210), calculating at least one position of the at least one hardware element with respect to the camera (stage 262), calculating therefrom at least one expected imaged location of the at least one hardware element (stage 263) based on the known position(s) of the hardware element(s), capturing images of the at least one hardware element by the camera (stage 265), processing the captured images to derive respective at least one imaged location of the at least one hardware element (stage 266), and indicating a discrepancy between the at least one derived imaged location and the at least one expected imaged location (stage 268). Indications 268 may be used to point at possible error sources which may then be identified and then corrected by hardware and/or software corrections according to the indicated discrepancy (stages 280, 285, 287, see above).

Method 200 may further comprise using at least one corresponding retroreflector as the at least one hardware element (stage 270) or associating retroreflectors to selected hardware elements, illuminating the retroreflector(s) (stage 272) and deriving the imaged location(s) using the retroreflected illumination (stage 274).

Any of the stages of method 200 may be at least partially implemented using at least one computer processor (stage 290)

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of reliability verification of a head wearable display (HWD) operated by a user within a cockpit of an aircraft, the method comprising:

tracking a position and orientation (P&O) of the HWD, during flight of said aircraft, in a reference coordinate system, relative to at least one hardware element, wherein the at least one hardware element has a known position within the reference coordinate system, is selected from a surroundings of the user, and is visible to the user through the HWD, and wherein the at least one hardware element comprises geometric shapes of cockpit hardware elements or aircraft parts outside the cockpit, which are visible and identifiable to the pilot during the flight;

displaying, in the HWD and according to the tracked P&O of the HWD in the reference coordinate system, a graphical verification symbol for the at least one hardware element, wherein as long as the P&O of the HWD is accurately tracked, each verification symbol appears to the user to be located at a same position as the at least one hardware element relative to said reference coordinate system;

advising the user of the HWD, whether the graphical verification symbols displayed by the HWD are presented conformally with respect to the real world, by indicating a degree of alignment between the graphical verification symbol and the at least one hardware element, wherein the degree of alignment between the graphical verification symbol in the reference coordinate system, with respect to the at least one hardware element indicates a degree of reliability of the HWD, wherein the graphical verification symbol is displayed whenever the user is determined by looking at the at least one hardware element, based on the P&O of the HWD, and wherein an area size of the at least one hardware element is larger than the area size of the graphical verification symbol.

2. The method of claim 1, further comprising receiving a user input indicative of the degree of alignment and identifying an error source related to the misplacement.

3. The method of claim 2, further comprising correcting software identified as being associated with the error source.

4. The method of claim 2, further comprising suggesting hardware corrections identified as being associated with the error source.

5. The method of claim 1, wherein the graphical verification symbol is displayed only whenever the user is determined by looking at the at least one hardware element, based on the P&O of the HWD.

6. The HWD system of claim 1, further configured to suggest hardware corrections identified as being associated with the error source.

7. A head wearable display (HWD) system comprising:

an HWD, a position and orientation (P&O) tracker configured to track the P&O of the HWD, within a cockpit of an aircraft during flight of said aircraft, relative to at least one hardware element, wherein the at least one hardware element has a known position within a reference coordinate system, is selected from a surroundings of a user of the HWD, and is visible to the user through the HWD, and wherein the at least one hardware element comprises geometric shapes of cockpit hardware elements or aircraft parts outside the cockpit, which are visible and identifiable to the pilot during the flight; and a display reliability verification module configured to:

calculate at least one position of the at least one hardware element with respect to the HWD;

display, in the HWD and according to the tracked P&O of the HWD in the reference coordinate system, a graphical verification symbol for the at least one hardware element, wherein the graphical verification symbol is displayed whenever the user is determined as looking at the at least one hardware element, based on the P&O of the HWD, wherein as long as the P&O of the HWD is accurately tracked, each verification symbol appears to the user to be located at a same position as the at least one hardware element relative to said reference coordinate system; and advise the user of the HWD, whether the graphical verification symbols displayed by the HWD are presented conformally with respect to the real world, by indicating a degree of alignment between the graphical verification symbol and the at least one hardware element, wherein the degree of alignment between the graphical verification symbol in the reference coordinate system, with respect to the at least one hardware element indicates a degree of reliability of the HWD, wherein an area size of the at least one hardware element is larger than the area size of the graphical verification symbol.

8. The HWD system of claim 7, further configured to receive user input concerning the degree of alignment and to identify an error source related to the misplacement.

9. The HWD system of claim 8, further configured to correct software identified as being associated with the error source.

10. The HWD system of claim 7, wherein the graphical verification symbol is displayed only whenever the user is determined by looking at the at least one hardware element, based on the P&O of the HWD.

11. An automated HWD reliability verification kit comprising:

a camera affixed to a HWD and configured to capture at least one hardware element having at least one known position, wherein the at least one hardware element is selected from a surroundings of a user operating the HWD and is visible to the user through the HWD, an image processing module configured to process the captured images to derive respective at least one imaged location of the at least one hardware element, a position and orientation (P&O) tracker configured to track the P&O of the HWD and of the camera, and a display reliability verification module configured to:

calculate at least one position of the at least one hardware element with respect to the tracked P&O of the HWD and of the camera, calculate therefrom at least one expected imaged location of the at least one hardware element, and to indicate a discrepancy between the at least one derived imaged location and the at least one expected imaged location; and instruct the HWD to display, according to the tracked P&O of the HWD in the reference coordinate system, a graphical verification symbol for the at least one hardware element, wherein as long as the P&O of the HWD is accurately tracked, each verification symbol appears to the user to be located at a same position as the at least one hardware element relative to said reference coordinate system, wherein an area size of the at least one hardware element is larger than the area size of the graphical verification symbol.

12. The automated HWD reliability verification kit of claim 11, further comprising:

at least one retroreflector, associated with corresponding at least one hardware element to be captured by the camera, and an illuminator configured to illuminate the at least one retroreflector, wherein the image processing module is configured to derive the at least one imaged location using retroreflected illumination.

* * * * *